US008226009B2

(12) United States Patent
Havens et al.

(10) Patent No.: US 8,226,009 B2
(45) Date of Patent: Jul. 24, 2012

(54) LASER SCANNER WITH IMPROVED DECODING

(75) Inventors: William H. Havens, Syracuse, NY (US);
Timothy P. Meier, Camillus, NY (US);
Ynjiun P. Wang, Cupertino, CA (US)

(73) Assignee: Hand Held Products, Inc., Skaneateles Falls, NY (US)

( * ) Notice: Subject to any disclaimer, the term of this patent is extended or adjusted under 35 U.S.C. 154(b) by 269 days.

(21) Appl. No.: 12/432,534

(22) Filed: Apr. 29, 2009

(65) Prior Publication Data

US 2010/0276490 A1     Nov. 4, 2010

(51) Int. Cl.
*G06K 7/10* (2006.01)

(52) U.S. Cl. ......... 235/462.32; 235/462.22; 235/462.23; 235/462.33; 235/462.36; 235/472.01; 359/665; 359/667

(58) Field of Classification Search ............. 235/462.22, 235/462.23, 462.36, 462.32, 462.33, 472.01; 359/665, 667
See application file for complete search history.

(56) References Cited

U.S. PATENT DOCUMENTS

| | | | |
|---|---|---|---|
| 5,945,670 A | 8/1999 | Rudeen | |
| 6,024,283 A | 2/2000 | Campanelli et al. | |
| 6,062,476 A | 5/2000 | Stern et al. | |
| 6,188,526 B1 | 2/2001 | Sasaya et al. | |
| 6,246,528 B1 | 6/2001 | Schachar | |
| 6,288,846 B1 | 9/2001 | Stoner, Jr. | |
| 6,344,930 B1 | 2/2002 | Kaneko et al. | |
| 6,369,954 B1 | 4/2002 | Berge et al. | |
| 6,543,693 B1 | 4/2003 | Stern et al. | |
| 6,618,208 B1 | 9/2003 | Silver | |
| 6,658,208 B2 | 12/2003 | Watanabe et al. | |
| 6,935,743 B2 | 8/2005 | Shadduck | |
| 7,025,468 B2 | 4/2006 | Nishioka et al. | |

(Continued)

FOREIGN PATENT DOCUMENTS

EP     1450291     8/2004

(Continued)

OTHER PUBLICATIONS

European Patent Office, European Patent Application No. 10161171.3, European Search Report, dated Mar. 15, 2011 (4 pages).

(Continued)

*Primary Examiner* — Daniel Hess
*Assistant Examiner* — Michael Andler
(74) *Attorney, Agent, or Firm* — Heslin, Rothenberg, Farley & Mesiti PC

(57) ABSTRACT

A scanning apparatus for decoding an encoded symbol character of a symbology includes a laser source operable to emit a beam along an axis and illuminate a target. The target includes an encoded symbol character. A focusing apparatus in optical communication with the laser source focuses the beam on the target at an object distance, and a detector receives light of varying intensities scattered from the encoded symbol character and converts the light into a first signal. A digitizer converts the first signal to a digital bit stream. The scanning apparatus further includes pre-stored information correlating a non-standard symbol pattern to a valid symbol character according to a standard definition of the symbology. The non-standard symbol pattern comprises a first number of elements that deviates from a second number of elements associated with the valid symbol character. A decoder receives the digital bit stream and utilizes the pre-stored information for decoding the signal.

18 Claims, 9 Drawing Sheets

U.S. PATENT DOCUMENTS

| | | |
|---|---|---|
| 7,068,439 B2 | 6/2006 | Esch et al. |
| 7,077,322 B2 | 7/2006 | Miyazawa et al. |
| 7,128,270 B2 | 10/2006 | Silverbrook et al. |
| 7,201,318 B2 | 4/2007 | Craen et al. |
| 7,243,849 B2 | 7/2007 | Lapstun et al. |
| 7,264,162 B2 * | 9/2007 | Barkan .................. 235/454 |
| 7,296,749 B2 | 11/2007 | Massieu |
| 7,352,434 B2 | 4/2008 | Streefkerk et al. |
| 7,369,723 B1 | 5/2008 | Mescher |
| 7,416,125 B2 | 8/2008 | Wang et al. |
| 7,450,273 B2 | 11/2008 | Silverbrook et al. |
| 2005/0200973 A1 | 9/2005 | Kogo et al. |
| 2006/0213999 A1 * | 9/2006 | Wang et al. ............. 235/462.25 |
| 2007/0030573 A1 | 2/2007 | Batchko et al. |
| 2007/0063048 A1 | 3/2007 | Havens et al. |
| 2007/0080280 A1 | 4/2007 | Havens |
| 2007/0097528 A1 | 5/2007 | Hagiwara et al. |
| 2007/0211207 A1 | 9/2007 | Lo et al. |
| 2008/0019015 A1 | 1/2008 | Fernandez et al. |
| 2008/0023552 A1 * | 1/2008 | Gillet et al. ............. 235/462.36 |
| 2008/0144185 A1 | 6/2008 | Wang et al. |
| 2008/0144186 A1 | 6/2008 | Feng et al. |
| 2008/0204905 A1 | 8/2008 | Mizuno et al. |
| 2008/0218873 A1 | 9/2008 | Batchko et al. |
| 2008/0231963 A1 | 9/2008 | Batchko et al. |
| 2008/0245872 A1 | 10/2008 | Good |
| 2008/0259463 A1 | 10/2008 | Shepherd |
| 2008/0277477 A1 | 11/2008 | Thuries et al. |
| 2008/0277480 A1 | 11/2008 | Thuries et al. |
| 2009/0072037 A1 | 3/2009 | Good et al. |
| 2009/0097140 A1 | 4/2009 | Choi et al. |

FOREIGN PATENT DOCUMENTS

| | | |
|---|---|---|
| JP | 2002162506 | 6/2002 |
| WO | WO-9415351 | 7/1994 |
| WO | WO-2005073895 | 8/2005 |
| WO | WO-2008076399 | 6/2008 |
| WO | WO-2008124235 | 10/2008 |

OTHER PUBLICATIONS

European Patent Office, European Patent No. 10161171.3, Communication pursuant to Article 94(3) EPC, dated Mar. 24, 2011 (6 pages).

Varioptic'S Liquid Auto-Focus Lens Wins 1st Prize in 2006 Dupont Plunkett Awards for Innovation With Teflon® (4 pp).

Nelson, Lee: Liquid Lens—Technology, Photonics, Vision systems design, Advanced imaging URL: http://articles.directorym.net/LIQUID_LENS-a906589.html (5 pp).

Hayes, Tim: Fluidic lenses move from laboratory to factory URL: http://optics.org/cws/article/industry/30803 Aug. 10, 1997 (2 pp).

U.S. Appl. No. 12/432,434, filed Apr. 29, 2009, Inventors: William H. Havens, Chen Feng, Ynjiun P. Wang.

U.S. Appl. No. 12/432,517, filed Apr. 29, 2009, Inventors: William H. Havens, Ynjiun P. Wang.

U.S. Appl. No. 12/432,534, filed Apr. 29, 2009, Inventors: William H. Havens, Timothy P. Meier, Ynjiun P. Wang.

U.S. Appl. No. 12/540,075, filed Aug. 12, 2009, Inventors: William H. Havens, Timothy P. Meier.

* cited by examiner

LASER SCANNER WITH IMPROVED DECODING

FIELD OF THE INVENTION

This invention relates generally to the field of optical scanning systems, and more particularly to a system and method for decoding images that increases performance of the system.

BACKGROUND OF THE INVENTION

Various optical scanning apparatus have been developed to read and decode optical indicia, such bar as code symbols on a target such as a label. While early bar code scanners were designed to read symbols at a relatively close distance, there exists a need to read symbols at greater and greater distances, for example in warehousing environments. Conventional optical scanning systems, such as hand-held bar code laser scanners, typically have a limited working range due to the constraints imposed on the optical assembly. Motorized systems with additional lenses or mirrors have been developed to re-position the laser beam waist relative to the fixed lens assembly, thereby increasing the working range of the scanning apparatus, but such improvements are complicated and add cost.

Decoding images has always proved challenging, in part because decoding systems work best with a sharp representation of the bar code symbol, and a sharp representation is not always possible. Due to optical, environmental or physical factors, the representation may be out of focus, too close to the reader, or too far away from the reader. One solution to this problem is to manually move the symbol to a range within the capability of the reader, either by moving the scanning apparatus or by moving the target. This solution can be cumbersome, frustrating, or may not even be possible. Various systems have been developed to aide in focusing the laser on the target, such as ranging systems to determine the distance from the reader to the target, but these systems add complexity and cost.

SUMMARY OF THE INVENTION

In view of the background, it is therefore an object of the present invention to provide a scanning apparatus that includes a laser source operable to emit a beam along an axis and illuminate a target. The target includes an encoded symbol character. A variable focus distance lens assembly in optical communication with the laser source focuses the beam on the target at an object distance, and a detector receives light of varying intensities scattered from the encoded symbol character and converts the light into a first signal. A digitizer converts the first signal to a digital bit stream. The scanning apparatus further includes pre-stored information correlating a non-standard symbol pattern to a valid symbol character according to a standard definition of the symbology. The non-standard symbol pattern comprises a first number of elements that deviates from a second number of elements associated with the valid symbol character. A decoder receives the digital bit stream and utilizes the pre-stored information for decoding the signal.

It is another object of the present invention is to utilize the pre-stored information to provide a scanning apparatus with an enhanced depth of field, thereby allowing a user of the apparatus to decipher symbol characters more quickly.

It is another object of the present invention is to utilize the pre-stored information to provide a scanning apparatus with an extended working range, thereby allowing a user of the apparatus to decipher symbol characters such as bar codes at a greater range of distances than previous scanning apparatuses.

BRIEF DESCRIPTION OF THE DRAWINGS

The novel features that are characteristic of the preferred embodiment of the invention are set forth with particularity in the claims. The invention itself may be best be understood, with respect to its organization and method of operation, with reference to the following description taken in connection with the accompanying drawings in which:

DETAILED DESCRIPTION OF THE PREFERRED EMBODIMENT

Figure 1:
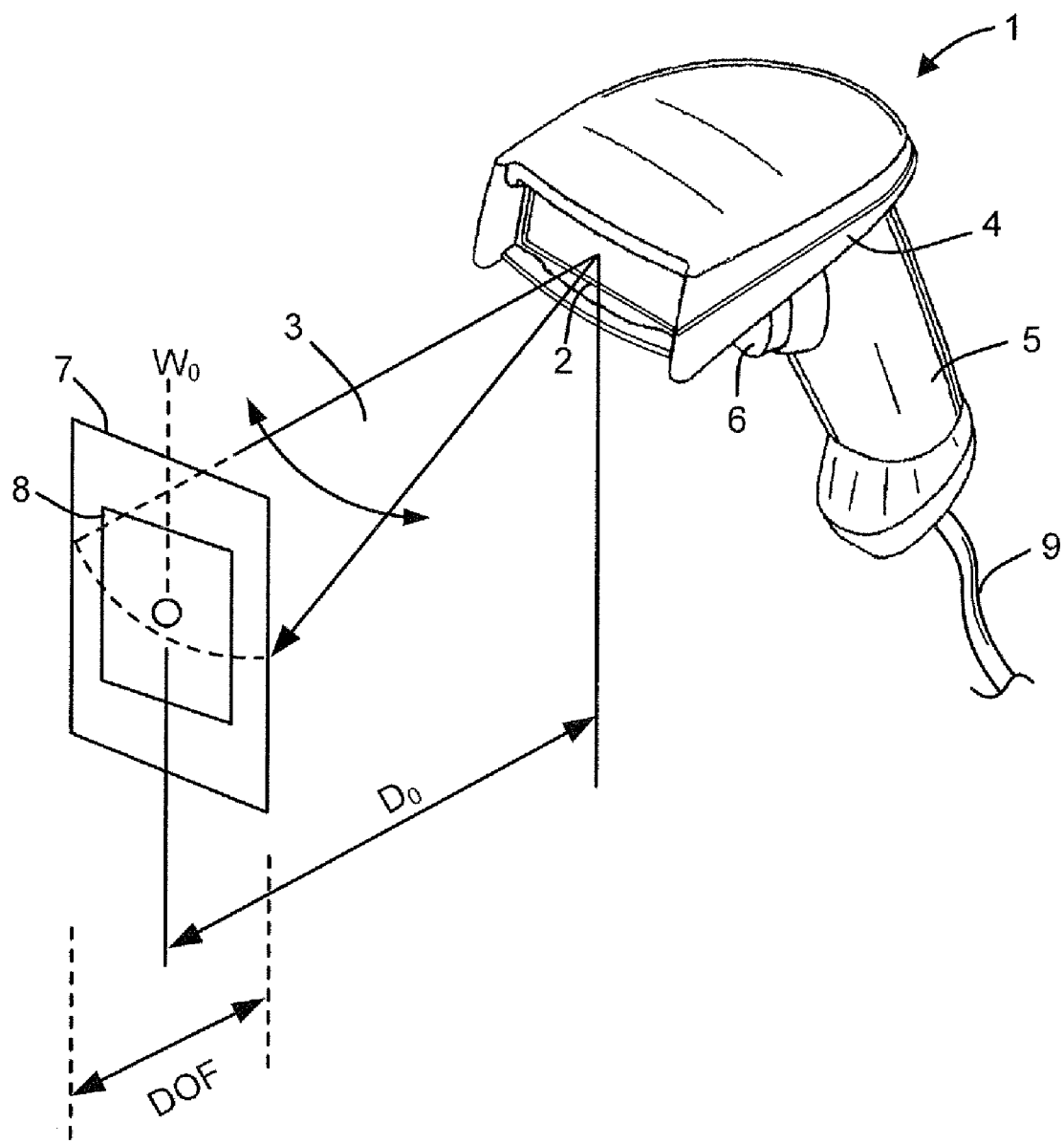
FIG. 1 is a perspective exterior view of a scanning apparatus according to an embodiment of the invention.

Referring to FIG. 1, shown is a typical prior art laser bar code reader 1. The reader 1 includes a housing 4 which, in one example, may have a pistol grip handle 5 and a trigger 6. The reader 1 further includes a fixed-lens assembly 2 for focusing a laser beam 3. Pressing the trigger 6 activates the laser beam 3 and allows the lens assembly 2 to focus the beam on a target 7 having optical indicia 8, such as a bar code symbol. The reader 1 may further include a data cable 9 to transfer data from the scanning apparatus to a host computer (not shown).

The fixed-lens reader 1 operates with the beam 3 focused at a fixed point $D_0$ from the housing. The depth of field (DOF) of the fixed-lens assembly 2 is the linear range about the focused point in which the reader 1 is able to decode the symbol 8. As used herein, depth of field is defined as the distance between the maximum and minimum plane in which a code reader is capable of reading symbols of a specified X dimension (nominal width dimension of the narrow bars and spaces in a bar code symbol). When the target 7 is brought into the depth of field of the reader at an object distance $D_0$, the bar code symbol 8 is decoded. A typical depth of field value for a 13 mil UPC bar code is approximately 13 inches (33 centimeters).

Variable focus lens assemblies have been developed to aide in extending the object distance of a laser bar code reader, for example in warehousing environments where the location of the target may be difficult to access. One example is an electro-wetting focusing apparatus that changes the object distance of the reader by varying the curvature of the lens according to an applied voltage. The electro-wetting lens assembly has the advantage of not only being able to decode symbols at long distances, twenty feet for example, but also at shorter distances. Although the electro-wetting lens assembly increases the range of working distances of the reader, they can be improved.

Typically, a reader employing a variable focus lens assembly will cycle through a pre-set range of object distances until a valid decode is achieved. The change in object distance between each scan cannot exceed the depth of field distance, or else there will be gaps in the working range of the reader. Thus, because the depth of field is limited by the ability of the reader to decode slightly out-of-focus images, as the working range of the reader increases more iterations are required to find a successful decode. As an example, a bar code reader with a working range from 12 inches to 24 inches (30.5 to 61 centimeters) will find a proper decode much faster than a scanner with a working range of 12 inches to 20 feet (30.5 centimeters to 6.1 meters), if the depth of focus is approximately the same. As the working range is increased by technological advancements to the lens assembly, additional pre-selected iterations must be evaluated before a proper decode is achieved.

Figure 2:
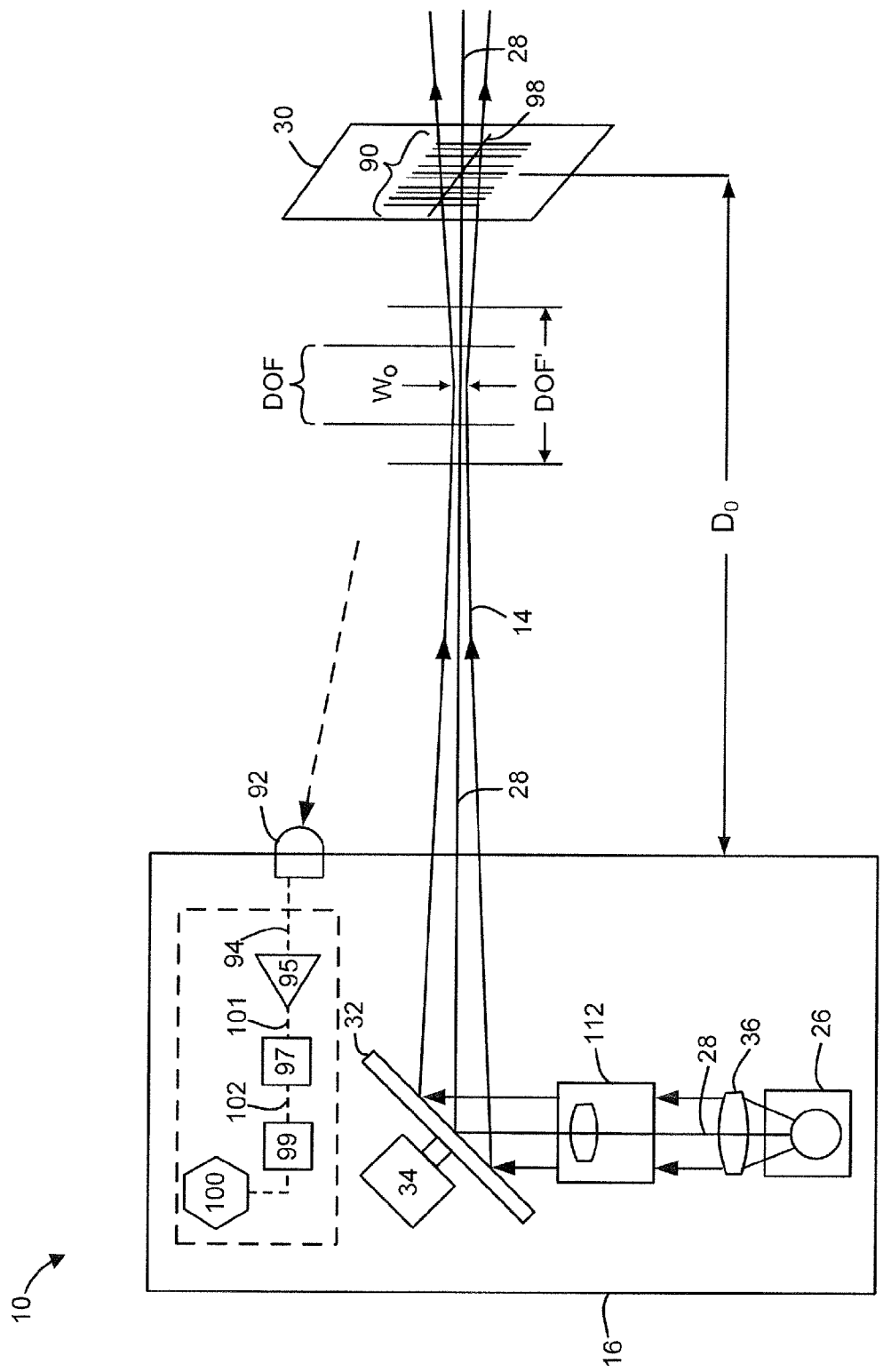
FIG. 2 is a schematic diagram showing in cross section the scanning apparatus shown in FIG. 1.

Referring to FIG. 2 of the drawings, a schematic view of the scanning apparatus 10 is shown for use in accordance with the present invention. The scanning apparatus 10 includes a housing 16 in which is secured a variable focus distance lens assembly 112. The scanning apparatus 10 in the illustrated example may be a hand-held reader including an electro-optical system for reading encoded symbol characters of a symbology, for example bar codes.

As used herein, "encoded symbol character" is intended to denote a representation of a unit of information in a message, such as the representation in a bar code symbology of a single alphanumeric character. One or more encoded symbol characters can be used to convey information, such as the identification of the source and the model of a product, for example in a UPC bar code that comprises twelve encoded symbol characters representing numerical digits. Also, an encoded symbol character may be a non-alphanumeric character that has an agreed upon conventional meaning, such as the elements comprising bars and spaces that are used to denote the start (left hand guard pattern), the end (right hand guard pattern), and the center (center guard bar pattern) of a UPC bar code. The bars and spaces used to encode a character as an encoded symbol are referred to generally as "elements." For example an encoded character in a UPC symbol consists of four elements, two bars and two spaces. Similarly, encoded symbol characters can be defined for other bar code symbologies, such as other one-dimensional ("1-D") bar code systems including Code 39 and Code 128, or for stacked two-dimensional ("2-D") bar code systems including PDF417.

The scanning apparatus 10 includes a laser source 26 mounted securely to the housing 16 and aligned so as to emit the laser beam 14 along an optical path, or axis 28, to illuminate a target 30. The laser source 26 may be a laser diode, for example. The scanning apparatus 10 further includes a scanning mirror 32 disposed within the optical path. In the disclosed embodiment, the scanning mirror 32 is positioned within the housing 16 after the variable focus distance lens assembly 112. The scanning mirror 32 reflects the emitted beam 14 incident thereon and aligns it to the target 30. Further, the scanning mirror 32 oscillates at a pre-determined frequency to sweep the beam 14 over the target 30 according to a pre-described scan pattern. The scan pattern may be along a line transverse to the plane of the target, e.g. a side-to-side motion. In some instances, an orthogonal scanning mechanism is added to allow raster scanning. The oscillation motion of the scanning mirror 32 may be driven by a motor 34.

A collimating lens 36 may be disposed along the axis 28 between the laser source 26 and the variable focus distance lens assembly 112 to produce a focused beam of light. In the disclosed example, the collimating lens 36 is disposed between the laser source 26 and the scanning mirror 32, but the lens may be placed at any advantageous location along the axis 28. In one embodiment, the collimating lens 36 is included as part of the assembly of the laser source 26. The collimating lens 36 is chosen by the manufacturer of the scanning apparatus 10 according to the particular requirements of the design.

Figure 3A:
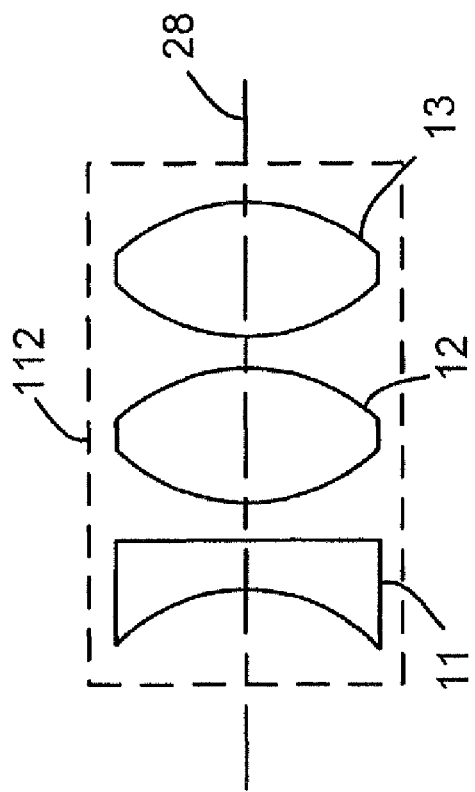
FIG. 3A is a schematic diagram showing in cross section a lens element in accordance with FIG. 2.
Figure 3B:
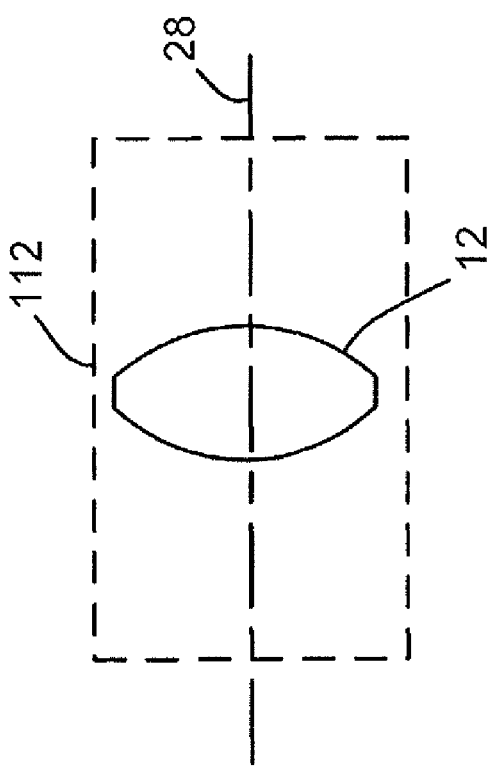
FIG. 3B is a schematic diagram showing in cross section alternate lens elements in accordance with FIG. 2.

As mentioned above, the scanning apparatus 10 includes the variable focus distance lens assembly 112 for focusing a beam on the target 30. As shown in FIG. 3A of the drawings, the variable focus distance lens assembly 112 includes at least one focusing apparatus 12. As shown in FIG. 3B, the variable focus distance lens assembly 112 may further include a plano-concave lens 11, a bi-convex correcting lens 13, or other lens elements to suit the particular needs of the scanning apparatus 10, such as lens elements to correct spherical aberration. In some examples, the variable focus distance lens assembly 112 may include a plurality of focusing apparatus 12. In general, the focusing apparatus 12 may include a deformable surface in optical communication with the beam 14. The deformable surface can act as a focusing lens, wherein an actuator acts upon the deformable surface to vary the curvature of the lens, thereby varying the focal length. In this manner, the object distance of the scanning apparatus 10 may be varied without resorting to moving a fixed lens along the axis 28. As referred to herein, object distance $D_O$ means the distance from the housing 16 to the target 30.

Figure 4:
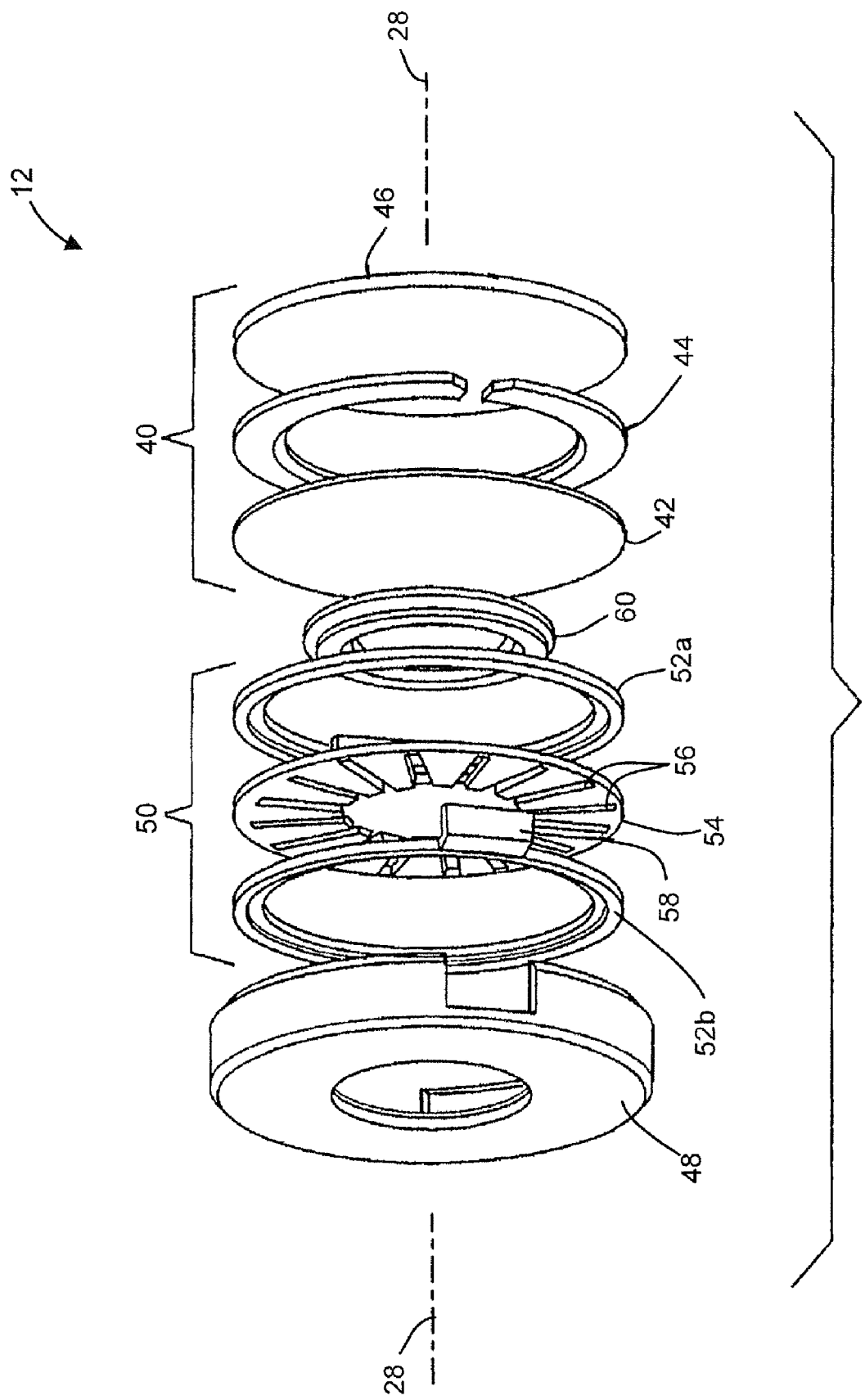
FIG. 4 is a schematic diagram showing in cross section one embodiment of a variable focus distance lens assembly shown in FIG. 2.

Referring to FIG. 4 of the drawings, one embodiment of the focusing apparatus 12 is schematically shown. A deformable lens assembly 40 includes a deformable surface 42, a spacer 44, and a transparent cover 46. In the illustrated example, the deformable surface 42 comprises a thin, nonporous, optically clear elastomer material such as SYLGARD 184 silicon elastomer, of the type available from DOW CORNING. The cover 46 may be provided by a piece of non-deformable glass. The cover 46 may be flat as shown, or convex to provide optical power. A housing 48 encapsulates the deformable lens assembly 40 and an actuator 50.

In another embodiment, a focusing apparatus 12 for use in scanning apparatus 10 may also be provided in accordance with focusing technologies described in U.S. patent application Ser. No. 12/432,434, entitled "FLUID LENS ELEMENT FOR USE IN CHANGING THERMAL OPERATING ENVIRONMENT" filed concurrently herewith, which is incorporated herein by reference in its entirety.

In yet another embodiment, a focusing apparatus 12 for use in scanning apparatus 10 may also be provided in accordance with focusing technologies described in U.S. patent application Ser. No. 12/432,517, entitled "LASER SCANNER WITH DEFORMABLE LENS" filed concurrently herewith, which is incorporated herein by reference in its entirety.

Various actuators can be utilized with the present invention. The actuator 50 illustrated in FIG. 4 is an ion conductive electro-active polymer (EAP) actuator. The actuator 50 includes a first conductor element 52a, a second conductor element 52b, and a deformable element 54 comprising a plurality of tab-like elements 56 interposed between the first conductor element 52a and second conductor element 52b. First conductor element 52a includes an electrical contact (hidden from view in FIG. 4) and second conductor element 52b also includes an electrical contact 58. Deformable element 54 can comprise one or more layers of conductive polymer material such that tab-like elements 56 bend generally in the direction of axis 28 toward deformable lens assembly 40 responsive to an electrical signal being applied to conductor elements 52a and 52b. Push ring 60 applies an external force to deformable surface 42 responsive to the movement of the tab-like elements 56, thereby providing actuation for the deformable lens assembly 40.

The focusing apparatus 12 operates within a range bounded by two extreme states. One extreme state is a "power off" state depicted in FIG. 5 wherein tab-like elements 56 bias the push ring 60 toward deformable surface 42. The other extreme state is a "power on" state (not shown) in which tab-like elements 56 pull push ring 60 away from deformable surface 42 so that deformable surface 42 is allowed to assume a generally flat and less convex configuration. In the "power off" state, the deformable surface 42 bulges to define a convex lens surface, thereby changing an optical characteristic of the focusing apparatus 12. The focusing apparatus 12 may operate in any state between the two extremes.

In another embodiment, the tab-like elements 56 could be biased in an opposite manner to provide a convex (bulged) deformable surface 42 only when voltage is applied. At a "power off" state, the deformable surface 42 assumes a generally flat and less convex configuration. In some embodiments surface 42 may even assume a concave configuration.

In yet another embodiment, a focusing apparatus 12 including the actuator for use in scanning apparatus 10 may also be provided in accordance with focusing technologies described in U.S. patent application Ser. No. 12/432,480, entitled "FOCUSING APPARATUS AND TERMINAL COMPRISING VARIABLE FOCUS LENS ASSEMBLY" filed concurrently herewith, which is incorporated herein by reference in its entirety.

Figure 5:
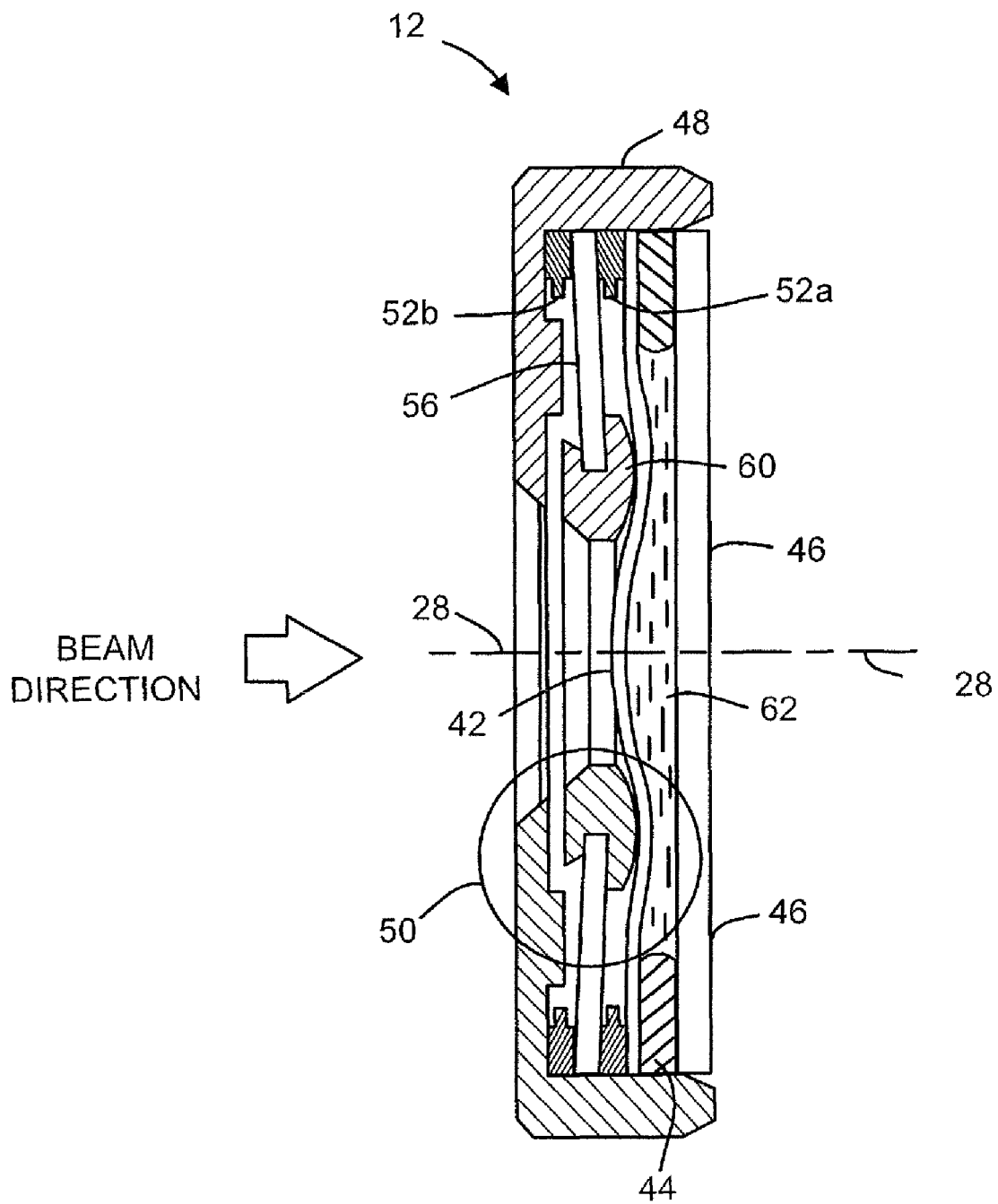
FIG. 5 is a schematic diagram showing in cross section a second embodiment of a variable focus distance lens assembly shown in FIG. 2.

Referring to FIG. 5 of the drawings, the focusing apparatus 12 is schematically shown having an ion conductive electroactive polymer actuator wherein the deformable surface 42 is in a deformed state. A cavity 62 bounded by the deformable surface 42, the spacer 44, and the cover 46 may hold an optically clear focus fluid. Selecting a focus fluid with a relatively high index of refraction will reduce the amount of deformation needed to obtain a given change in focal length. In one example, a suitable index of refraction would be in the range of from about 1.3 to about 2.0. One example of a suitable focus fluid (optical fluid) is SL-5267 OPTICAL FLUID, available from SANTOLIGHT, refractive index=1.67.

Figure 6:
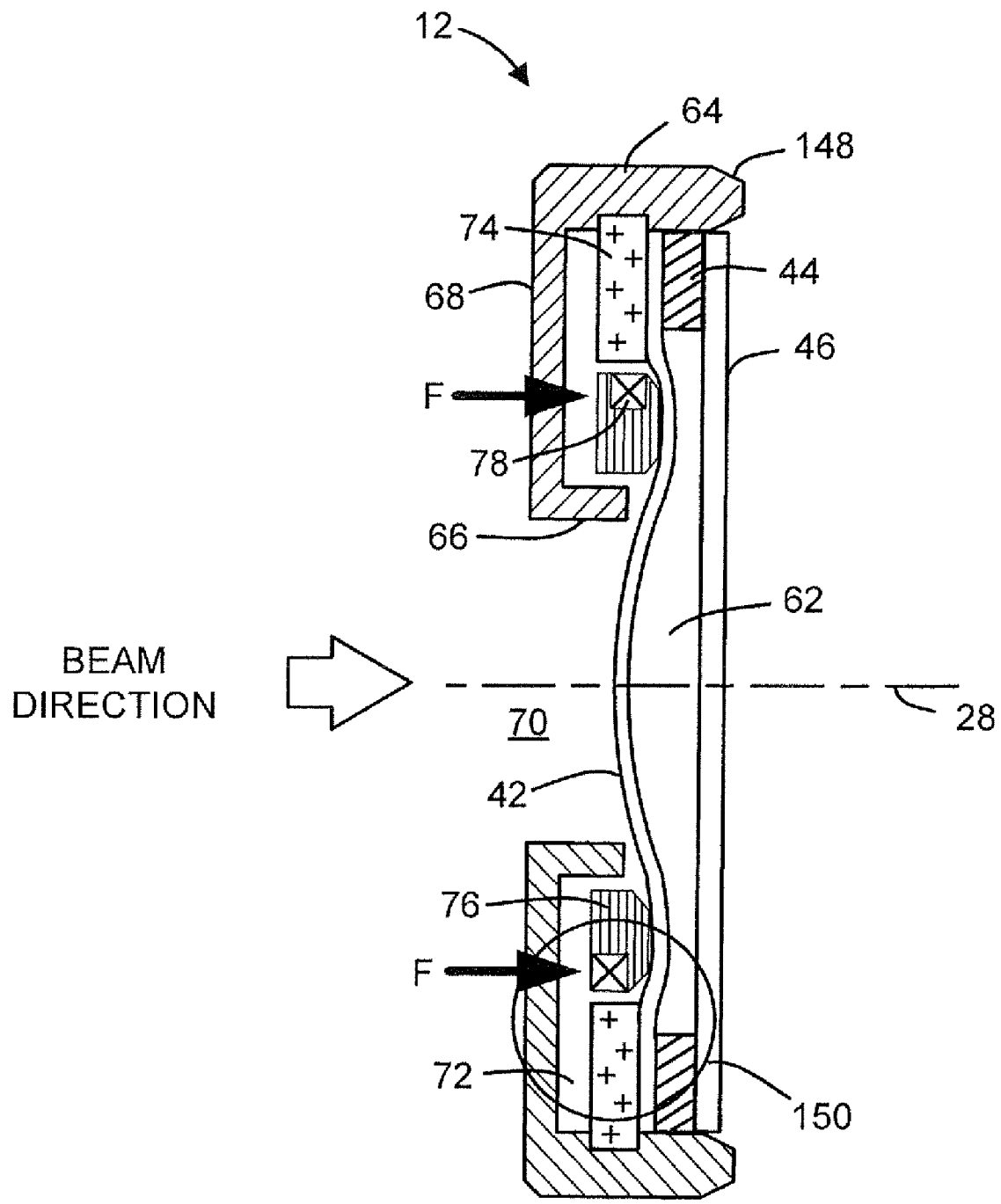
FIG. 6 is a schematic diagram showing in cross section a third embodiment of a variable focus distance lens assembly shown in FIG. 2.

Turning now to FIG. 6 of the drawings, wherein like numerals indicate like elements of FIG. 5, a preferred focusing apparatus 12 is schematically shown. In the illustrated example, the actuator 150 is a voice coil actuator. A housing 148 defines a cylindrical outer wall 64 and a cylindrical inner post 66 joined by a back plate 68. The inner post 66 is hollow, forming a center bore 70 aligned with the optical axis 28, through which the laser beam 14 passes. The housing 148 further defines an interior region 72 formed therein to capture and hold the voice coil components. Within the interior region 72, a permanent magnet 74 is secured to the inner diameter of the outer wall 64. A push ring 76 or ring having a wire coil 78 floats within the remaining interior region 72. The deformable surface 42, spacer 44, and cover 46 are secured to the inner diameter of the outer wall 64, as previously disclosed with reference to FIG. 5. A focus fluid having an index of refraction greater than 1.0 may be disposed in the cavity 62.

In operation, an appropriate electric current is passed through the coil 78 and generates an electrical field. The electric field interacts with the magnetic field induced by the permanent magnet 74 according to the Lorentz law, creating a driving force F at right angles to both the direction of current and magnetic flux, shown by the arrow in FIG. 6. The amount of force F is directly proportional to the current passing through the coil 78. The force F causes the push ring 76 to move in a direction along the axis 28 in the same direction as the optical axis 28 and the propagation direction of the laser beam 14. The push ring 76 presses the deformable surface 42, causing a bulging of the deformable surface 42 in a manner to create a convex lens surface. Due to the nature of voice coil design, extremely accurate movements can be achieved in very small time periods, allowing focusing apparatus 12 to be regulated with great precision.

Figure 7:
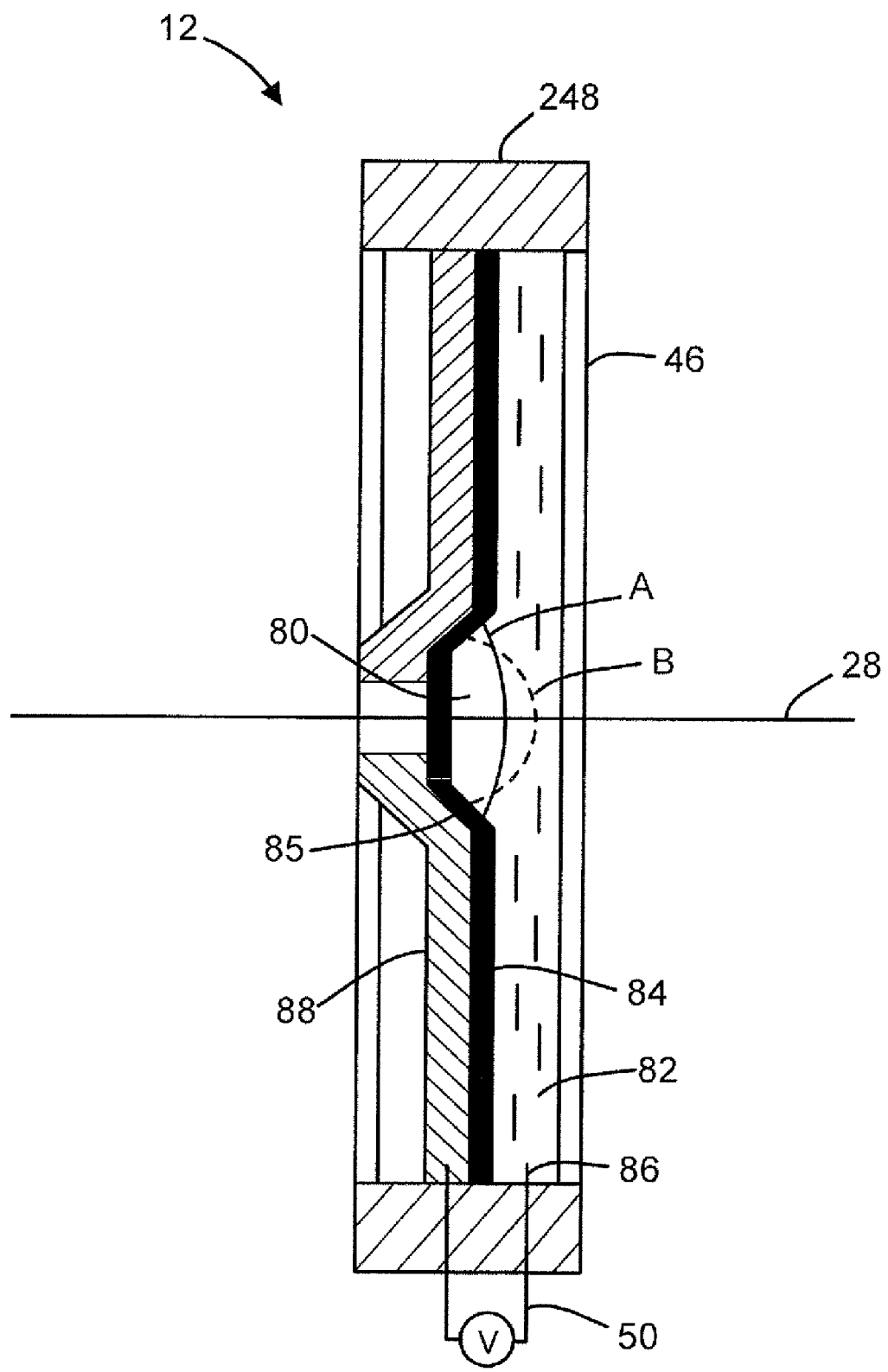
FIG. 7 is a schematic diagram showing in cross section a fourth embodiment of a variable focus distance lens assembly shown in FIG. 2.

Referring to FIG. 7 of the drawings, a third embodiment of the focusing apparatus 12 is schematically shown as an electro-wetting focusing apparatus including a housing 248 in which a first liquid 80, shown in droplet form, and a second liquid 82 are arranged along the optical axis 28. The liquids 80, 82 are light-transmissive, immiscible, of different optical indices of refraction and of substantially the same density. The liquid or drop 80 is constituted of an electrically insulating substance. For example, an oil, an alcane, or a blend of alcanes, preferably halogenated, or any other insulating liquid may be used for the drop 80. The liquid 82 is constituted of an electrically conductive substance, for example, water loaded with salts (mineral or other), or any other liquid, organic or not, and preferably made conductive by the addition of ionic components. The housing 248 includes a dielectric wall 84, preferably having a well 85 in which the drop 80 is accommodated in symmetrical relation relative to the axis 28. The wall 84 normally has a low wetting characteristic compared to the drop 80, but a surface treatment insures a high wetting characteristic and maintains a centered position of the drop 80 and prevents the drop from spreading. The well 85 further helps to prevent such spreading.

A first electrode 86 extends into the liquid 82, and a second electrode 88 is located below the wall 84. The electrodes are connected to a voltage source V, which may be thought of as the actuator 50. The electrodes, especially electrode 88, are preferably light-transmissive. When a voltage is applied across the electrodes, an electrical force field is created which alters the wetting characteristic of the drop 80 with respect to the wall 84. The wetting increases substantially in the presence of an electrical field. With no voltage applied, the drop 80 takes the generally hemispherical shape shown in solid lines in FIG. 7, and its outer surface "A" is convex. When a voltage is applied, the wetting of the dielectric wall 84 increases, and the drop 80 deforms and takes the shape shown in dashed lines in FIG. 7, and its outer surface "B" is more convex with a smaller radius of curvature. This deformation of the drop changes the focus of the focusing apparatus 12 and is useful to read the symbol characters over an extended range of distances.

Referring now back to FIG. 2, the laser beam 14 passes through the variable focus distance lens assembly 112 striking the target 30 at an object distance $D_o$. In the illustrated example the target 30 includes a plurality of encoded symbol characters 90, which in one example is a 1-D bar code. Laser light illuminating the symbol characters 90 is scattered from areas of light and dark bands. A detector 92, such as a photodiode, is secured to the scanning apparatus 10 and detects the scattered light and generates a small electrical current that is proportional to the amount of light returned. An amplifier 95 increases the signal from the detector 92 to a useable level.

The analog voltage signal 101 from the amplifier 95 is digitized with a digitizer 97, and the digitized bit stream 102 is passed to a decoder 99, which may be part of a system controller 96. In the illustrated example below, the output 102 from the digitizer 97 is a one-bit signal representing either dark or light elements of the symbol characters 90, but the bit stream 102 may vary according to the decoding method being utilized. For example, the digitizer 97 may produce an 8-bit signal.

The decoder 99 measures and quantizes the width of each element (light or dark) and compares the quantized element widths to valid symbol characters of the symbology contained in pre-stored information 100. In one example, the pre-stored information 100 is a lookup table residing within the controller 96. When the signal 102 is successfully decoded, the output may be passed to a display device, for example.

In one example, the scanning apparatus 10 operates in an open-loop cycle, meaning the controller 96 receives no feedback as to the location of the beam waist $W_0$ relative to the target 30. When the scanning apparatus 10 is activated, such as when an operator depresses the trigger, the scanning apparatus 10 captures a first signal 94 with the variable focus distance lens assembly 112 set to a first focus distance. If the signal 102 cannot be decoded using the conventional techniques described above, the controller 96 may alternately attempt to decode the signal by correlating it to non-standard symbol patterns that are not associated with valid symbol characters, as will be explained in detail below. If the signal 102 still cannot be decoded after attempting to correlate it to non-standard symbol patterns, the controller 96 may command the focusing apparatus 12 to change the focus distance of the beam 28 and capture a second signal 94 with the lens assembly 112 set to a second focus distance. The sequence of attempting to decode by comparing the signal 102 to valid symbol characters and non-standard symbol patterns prior to adjusting the focus distance continues until one of either a successful decode, trigger release or a time limit is achieved.

In a bar code scan, information is available as to what the particular bar code is expected to look like and how it is expected to appear in coded form. For example, a UPC bar code is comprised of encoded symbol characters represented by sequences of 4 alternating bars and spaces (or spaces and bars) having a total width of 7 width units. The bars are generally black rectangular marks having low reflectivity. The spaces are generally regions free of ink such that a white or light color of a substrate is visible, and are generally highly reflective by comparison to bars. An image of a valid symbol character in bar code comprises one or more bars and spaces typically represented by a step function. When imaged and processed by a digitizer 97 with the bar code reader, the bar code is represented as a codeword having a sequence of binary values, for example. Typically, a decode table defines the exact step function of each codeword that is available, and the decoder 99 decodes the signal 102 according to at least one algorithm.

As mentioned above, not all encoded symbol characters 90 read by the scanning apparatus 10 can be decoded, however. In some situations, optical, environmental or physical factors may distort the signal 94 such that conventional decode algorithms are of little use. The target 30 may be at an object distance significantly different from the beam waist (out of focus), the bar code may be poorly illuminated so the contrast between black and white is not distinct, or the symbol characters 90 may be degraded.

As defined herein, "degraded encoded symbol character" is intended to denote an encoded symbol character that has been modified, whether deliberately or by happenstance, so that the degraded encoded symbol character is no longer in conformance with accepted standards for that type of encoded symbol character, no matter what orientation is used for viewing or scanning the encoded symbol character.

A degraded UPC encoded symbol character could be any of an encoded symbol character in which ink or other dark material is applied so that one or more bars are expanded in width over their entire length, for example by covering a white space intervening between two black bars with black ink, so that a bar-space-bar sequence is converted into a single wide bar. Conversely, the application of a white (or highly reflective) substance over some width of a bar (and over its entire length) can create a situation where the width of a space is increased and the width of an adjacent bar is decreased (in the extreme converting a space-bar-space sequence into a single wider space), or a wide bar is made to appear as a thinner bar followed by a space followed by another bar, such that the total width of the original bar is used to represent not one bar, but two bars separated by a space.

In some examples, the symbol characters 90 may appear to be degraded in the signal 94, but are in fact within the printing specification. Such an example may exist when the laser beam waist is not aligned with the target 30. Referring to FIG. 2 of the drawings, the waist of beam 14 is denoted as $W_0$. Ideally, if the target 30 is at an object distance $D_o$ that coincides with the distance to $W_0$, the symbol characters 90 would have the sharpest contrast as sensed by the detector 92. In reality, some variance of the object distance $D_o$ from $W_0$ is permitted and the contrast as sensed by the detector 92 will be sufficient for a successful decode. This distance is the depth of field, and is denoted as DOF in FIG. 2. If the object distance $D_o$ is within the depth of field range, the decode will be successful. The depth of field typically varies according to the width of the bar code element. For example, a bar code reader operable to read a 13 mil bar code typically may have a depth of field of 13 inches (33 centimeters). For a 7.5 mil bar code, the depth of field may be typically 5.75 inches (14.6 centimeters), and for a 5 mil bar code the depth of field may be typically 0.85 inches (2.2 centimeters). In conventional optical scanning systems, when the location of the target 30 is beyond the depth of field range, the signal 94 will deteriorate, simulating the condition of a degraded encoded symbol character. Accordingly, configuring the scanning apparatus 10 to decode signals 94 beyond the normal depth of field range allows the scanning apparatus 10 to decode signals 94 generated when the scanning apparatus 10 is out of focus.

Figure 8:
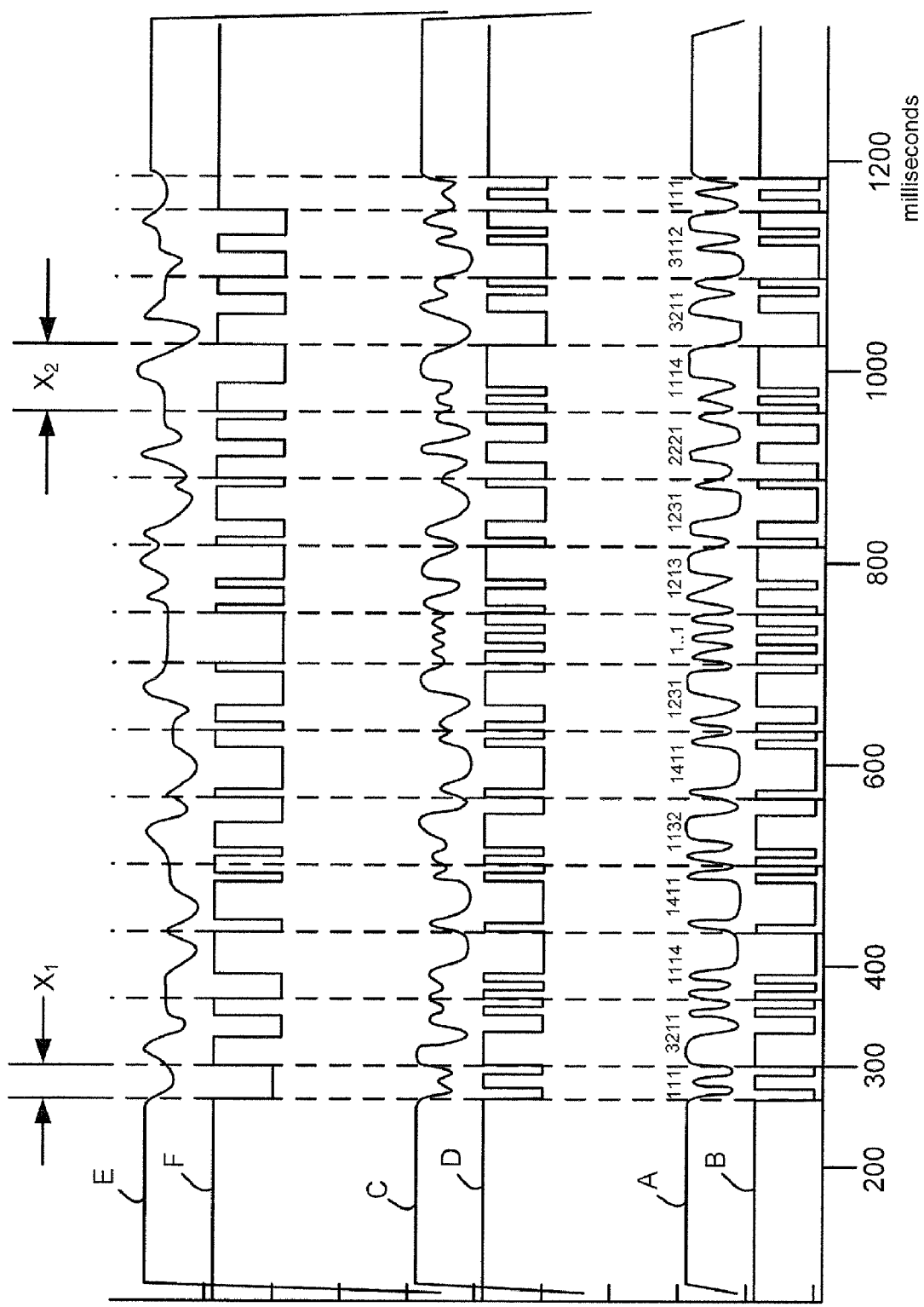
FIG. 8 is a diagram that illustrates various signals from the detector of FIG. 2.

Referring to FIG. 8 of the drawings, the various curves identified by the letters "A" through "F" represent recorded signals detected from a bar code, and signals obtained by subjecting the recorded signals to signal processing methods. In FIG. 8, the intensity of reflected illumination is given along the vertical axis (in arbitrary units). For reflective regions, such as white spaces, the reflectivity is relatively high, and the curve is correspondingly indicated as having a higher numerical value on the vertical axis. For black bars, which have lower reflectivity, the curve has a correspondingly lower numerical value on the vertical axis. In FIG. 8, the horizontal axis represents distance along a scan line 98 shown passing over the bar code of FIG. 2. Alternatively, the horizontal axis can be considered to be a time axis, shown in milliseconds.

The curve identified by the letter "A" is an illustrated signal recorded as the output signal of the detector 92 (FIG. 2) that detects light intensity corresponding to illumination reflected from an encoded symbol character and that generates an electrical signal from the detected light intensity. In FIG. 8, the step function identified by the letter "B" is the signal derived from curve "A" by subjecting curve "A" to conventional digitizing techniques.

In reading the sequence of fluctuations or changes of state in the actual data of curve "A," or in the step function "B" derived from curve "A," there is a mathematical sequence that can be defined. The sequence of widths of the elements (the bars and spaces) that appear in the encoded symbol characters is termed the "e-sequence" or "eseq" for convenience. An element width sequence ("eseq") can be derived from measuring the width of edge to edge transitions of the step function "B". For example, the step function "B" eseq is: (left hand guard bar pattern) 3211-1114-1411-1132-1411-1231 (center guard bar pattern) 1213-1231-2221-1114-3211-3112-(right hand guard bar pattern). Curve "A" and step function "B" represent an undistorted, unmodified, and undamaged UPC bar code which is being read under proper conditions of illumination and within the depth of field of the bar code reader. Applying conventional decoding techniques using decoding values such as that found in columns one and two of Table I, the signal 94 would decode as the alphanumeric string of numbers 0-6-3-4-3-5-8-5-1-6-0-9.

Curve "C" of FIG. 8 is another example of a signal recorded as the output signal of the detector 92. Comparison of curve "C" with curve "A" shows that features of the signal are becoming degraded, which can result from one or more of the conditions cited above. Nevertheless, by comparing curve "B" and step function "D," one sees that conventional decoding techniques can still read the bar code accurately. Alternately this pattern might be created by intentional modification of the bar space pattern.

In curve "E", further degradation is evident due to reading a bar code that is well beyond beam waist of the laser beam, or a bar code that is hand motion smeared while capturing the image, or both, for example. The measured data has lost much of its detail, and some elements appear as large undifferentiated signals. As is seen from step function "F," conventional decoding algorithms are not able to identify a significant number of zero crossings, and the digitized step function "F" is not meaningful when viewed with a conventional bar code reader or imager.

The system and method of the present invention alleviates decoding problems encountered when the signal 102 (FIG. 2) does not conform to any of the expected patterns associated with the bar space patterns of a particular symbology. Pre-stored information 100, e.g. a look-up table comprising one or more mathematical formulas, is stored in the controller 96 that correlate a distorted image or deviated symbol pattern to a valid symbol character that is associated with a standard definition of the symbology. The computed distorted image stored in the table can be compared to the image "seen" by the reader. Elements for the look-up table, or tables, may be generated by computation or by experimentation, that is, by setting up "reads" of known indicia at known distances, and recording the signals so produced, as a way of building the lookup table. One example method of correlating the deviated symbol pattern involves the use of least squares methods, whereby the raw data that are collected are subjected to least squares methods by comparison with the expected patterns of known encoded symbol characters. The sequence that results in the lowest residue, or least squares error, is considered to be the correct sequence.

Table I illustrates one example of deviated symbol patterns. Column one lists the numeric value encoded in the symbology, and column two lists the corresponding valid symbol characters, e.g., the 4-element width sequence of each numeral. Column three lists possible distorted symbol elements that deviate from the valid symbol characters of column two. In the illustrated example, the distorted symbol elements arise if bars and spaces having one-element widths are distorted, smeared, blurred, or damaged as compared to bars and spaces having widths of two-, three-, or four-element widths. Note that the distorted symbol elements of column three form a 3-element sequence width and do not correspond to any numeral in column one, so a conventional bar code reader would not be able to decode the pattern. One example of such a distorted symbol element can be found in curve "F" in FIG. 8 at $X_1=300$, wherein the symbol character 3-2-1-1 has been distorted to appear as 3-2-2.

TABLE I

| Decimal Digit | 4 element width sequence | 3 element width sequence (1-1->2 distortion) | 2 element width sequence (1-2->3 distortion) |
| --- | --- | --- | --- |
| 0 | 3-2-1-1 | 3-2-2 | |
| 1 | 2-2-2-1 | | |
| 2 | 2-1-2-2 | | |
| 3 | 1-4-1-1 | 1-4-2 | |
| 4 | 1-1-3-2 | 2-3-2 | |
| 5 | 1-2-3-1 | | |
| 6 | 1-1-1-4 | 2-1-4 | 3-4 |
| 6 | 1-1-1-4 | 1-2-4 | 3-4 |
| 7 | 1-3-1-2 | | |
| 8 | 1-2-1-3 | | |
| 9 | 3-1-1-2 | 3-2-2 | |

Similarly, column four of Table I lists additional possible distorted symbol elements that deviate from the valid symbol characters of column two. In column four, the distorted symbol elements form a 2-element sequence width and do not correspond to any numeral in column one. An example of such a distorted symbol element can be found in curve "F" in FIG. 8 at $X_2=1000$, wherein the symbol character 1-1-1-4 has been distorted to appear as 3-4.

Referring now to FIGS. 2, 3A, 3B, 4, and 5 of the drawings, in one embodiment of the invention, the scanning apparatus 10 generates a first signal 94 with the focusing apparatus 12 configured at a first setting, namely the "power off" setting wherein the focusing apparatus 12 is at a rest state, depicted as object distance $D_o$ in FIG. 2. The controller 96 attempts to decode the signal 94 and, being unsuccessful, utilizes the pre-stored information 100 in Table I, for example, and attempts to decode the signal again. If unsuccessful, the controller 96 commands the actuator 50 (FIGS. 4, 5) to impart a force to the focusing apparatus 12, thereby causing the object distance for the lens assembly to change. In one example, the new object distance falls within the enhanced depth of field range DOF' as shown in FIG. 2. The controller 96 attempts to decode the second signal 94 utilizing conventional decoding methods and, being unsuccessful, utilizes the pre-stored information 100 in Table I. The symbol pattern, being out of focus and appearing as curve "F" in FIG. 8, is properly decoded utilizing the pre-stored information 100.

In another embodiment of the invention, the scanning apparatus 10 is utilized to decode a bar code symbol that has been intentionally distorted. In one example, two 1-element sequences in a bar space pattern are joined together to form one 2-element sequence. The sequences may be joined together by filling in the space of the bar space pattern with a pen, for example. The resulting distorted pattern may still be decoded by the scanning apparatus 10 because the distorted pattern is stored in a reference table, e.g., Table I.

Two advantages can readily be discerned by utilizing the scanning apparatus 10. First, the depth of field is increased, thereby requiring less iterations by the controller 96 to achieve a proper decode. Second, if the object distance of the target 30 is beyond the maximum range capability of the scanning apparatus 10, for example at the "power off" state, the scanning apparatus 10 may still be operable to decode the symbol pattern if the target 30 is within the extended depth of field. In this manner, the overall working range of the scanning apparatus 10 is increased beyond its physical capabilities.

Figure 9:
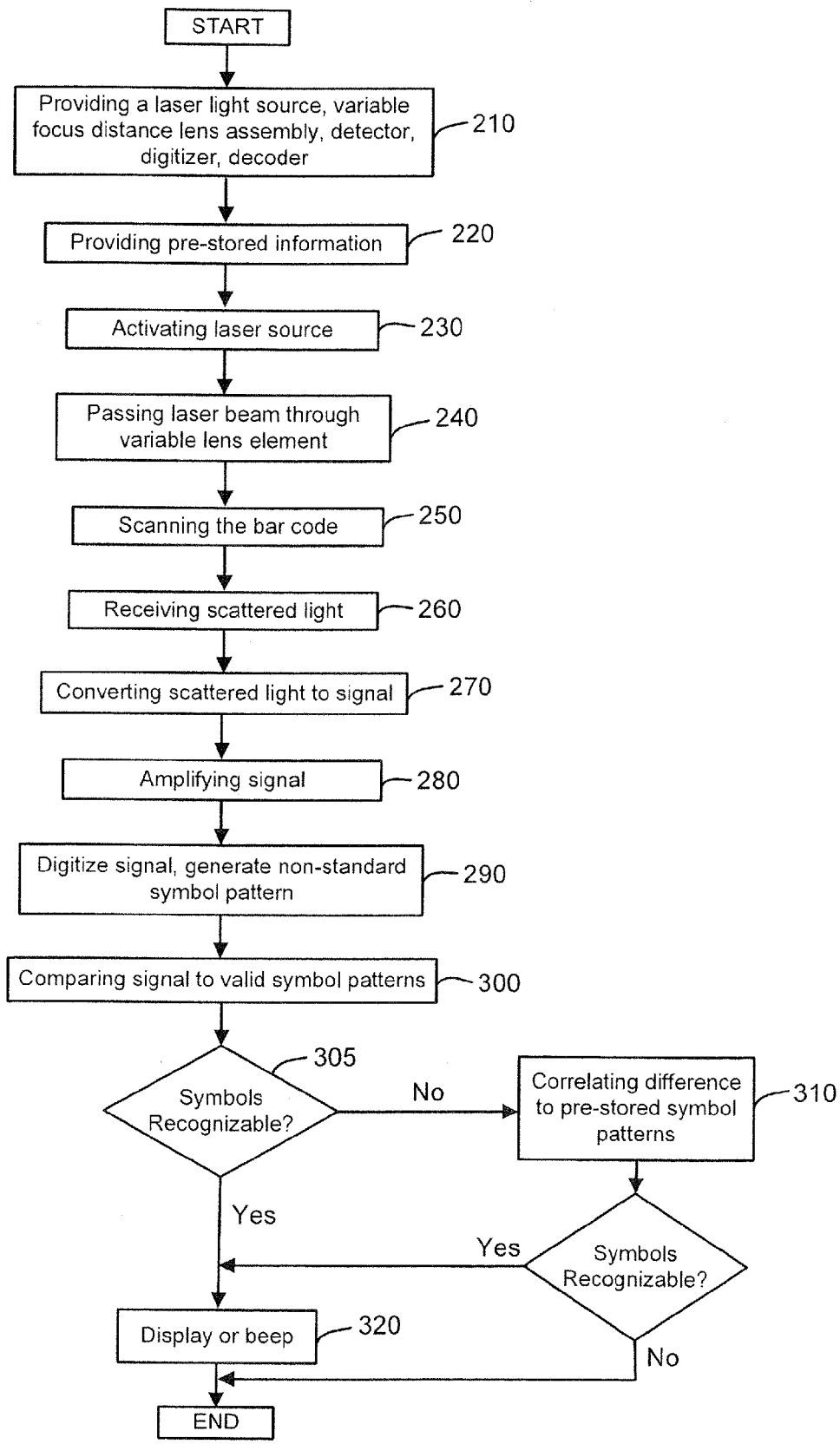
FIG. 9 is a block diagram of a method for operating a scanning apparatus in accordance with an embodiment of the present invention.

Referring to FIG. 9 (and FIG. 2 for element numbers), a method 200 of operating the scanning apparatus 10 is shown. The method 200 comprises a step 210 of providing the laser light source 26, a variable focus distance lens assembly 112, and a detector 92, a digitizer 97, and a decoder 99. The method 200 further comprises a step 220 of providing the controller 96 with pre-stored information 100. The pre-stored information comprises expected deviations of known, valid symbol patterns. The deviations may be classified according to bars and spaces having one-element widths that are distorted, smeared, blurred, or damaged as compared to bars and spaces having widths of two-, three-, or four-element widths. The deviations may be stored in lookup tables, for example.

At a step 230, the laser source 26 is activated and at a step 240 the laser source passes the laser beam 14 through the focusing apparatus 12 (FIG. 3B) along the axis 28, scanning an encoded symbol character 90 at a step 250. At a step 260, the detector 92 receives the light scattered from the encoded symbol character 90 and, at a step 270, converts the scattered light the signal 94. At a step 280, the amplifier 95 increases the signal to a usable level and passes the amplified signal 101 to the digitizer 97. At a step 290, the digitizer 97 generates a symbol pattern and passes the signal 102 to the decoder 99.

At a step 300, the signal 94 is compared to valid, e.g., known, symbol patterns for a symbology. If the observed symbol pattern does not match any known patterns, as shown at a step 305, the controller accesses the pre-stored information and, at a step 310, correlates the observed deviations to the deviations stored in the pre-stored information. If the observed symbol pattern matches any of the deviations stored in the pre-stored information, as shown at a step 315, the decode is successful and the controller proceeds to a step 320 and the result is indicated by a display or a beep, for example. If the symbol pattern cannot be decoded, the method 200 iterates until a valid symbol pattern is correlated and the controller 96 can successfully decode the signal 94 or time out and initiate the process anew with new data.

A small sample of systems methods and apparatus that are described herein is as follows:

A1. An scanning apparatus for decoding an encoded symbol character of a symbology, comprising:
  a laser source operable to emit a beam along an axis and illuminate a target, the target comprising the encoded symbol character;
  a scanning mirror disposed intermediate the laser source and the target, the scanning mirror operable to deflect the beam emitted from the laser source so that the beam scans across the target according to a scan pattern;
  a focusing apparatus in optical communication with the laser source for focusing the beam on the target at an object distance;
  a detector operable to receive light of varying intensities scattered from the encoded symbol character and convert the light into a first signal;
  a digitizer operable to convert the first signal to a digital bit stream;
  pre-stored information correlating a non-standard symbol pattern to a valid symbol character according to a standard definition of the symbology, the non-standard symbol pattern comprising a first number of elements that deviates from a second number of elements associated with the valid symbol character; and
  a decoder operable to receive the digital bit stream and utilize the pre-stored information for decoding the signal.

A2. The scanning apparatus according to claim A1 wherein the scanning apparatus is operable to generate the first signal with the focusing apparatus configured at a first setting, generate a second signal with the focusing apparatus configured at a second setting, and is further operable to decode the first signal and the second signal utilizing the pre-stored information.

A3. The scanning apparatus according to claim A1 wherein the non-standard symbol pattern is a bar space pattern.

A4. The scanning apparatus according to claim A3 wherein the symbology is selected from the group consisting of a Universal Product Code, a Code 39, and a PDF417 symbology.

A5. The scanning apparatus according to claim A3 wherein the first number of elements is a 3-element width sequence and the second number of elements is a 4-element sequence, and the decoder utilizes the pre-stored information to decode the 3-element width sequence to the valid symbol character of the symbology.

A6. The scanning apparatus according to claim A5 wherein the 3-element width sequence is generated by converting two 1-element widths to a single 2-element width.

A7. The scanning apparatus of claim A1 wherein the focusing apparatus comprises a deformable lens element and an actuator, the deformable lens element having a deformable surface, at least part of which transmits the beam, the actuator operable to impart a force to the deformable surface.

A8. The scanning apparatus of claim A7 wherein the force is in a first direction substantially parallel with the axis.

A9. The scanning apparatus of claim A8 wherein the deformable surface is configured to deform along a second direction, opposite the first direction.

A10. The scanning apparatus of claim A7 wherein the actuator imparts the force at a continuum of force impartation points formed in an area pattern about the axis.

A11. The scanning apparatus of claim A7 wherein the focusing apparatus is an electro-wetting focusing apparatus comprising a pair of light transmissive liquids having different optical indices of refraction, one of the liquids having a drop shape accommodated in a well in a rest state for optically modifying the beam, the actuator being a voltage applied across one of the liquids to change the shape thereof.

B1. A method for operating a scanning apparatus comprising the steps of:
  providing a laser light source, a focusing apparatus, a detector, a digitizer, and a decoder;
  providing pre-stored information correlating a non-standard symbol pattern to a valid symbol character according to a standard definition of the symbology, the non-standard symbol pattern comprising a first number of elements that deviates from a second number of elements associated with the valid symbol character;
  activating the laser light source;
  passing a laser beam through the focusing apparatus along an axis to illuminate a target, the target comprising an encoded symbol character;
  scanning the encoded symbol character;
  receiving scattered light from the target and converting it to a first signal;

converting the first signal to a second signal comprising a digital bit stream;

generating a non-standard symbol pattern from the digital bit stream; and decoding the non-standard symbol pattern utilizing the pre-stored information.

B2. The method of claim B1, further comprising a step of comparing the signal generated by the detector to a predefined signal.

B3. The method of claim B1, wherein the encoded symbol character on the target is a degraded encoded symbol character.

B4 The method of claim B3, wherein the degraded encoded symbol character is selected from the group comprising a Universal Product Code, a Code 39, and a PDF417 symbology.

B5. The method of claim B4, wherein the non-standard symbol pattern is a 3-element width bar space pattern, the second number of elements associated with the valid symbol character is a 4-element bar space pattern, and the method further includes the step of obstructing two 1-element width sequences on the encoded symbol character to create one 2-element width sequence.

B6. The method of claim B1, wherein the focusing apparatus is an electro-wetting focusing apparatus comprising a pair of light transmissive liquids having different optical indices of refraction, one of the liquids having a drop shape accommodated in a well in a rest state for optically modifying the beam.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than the mentioned certain number of elements. Also, while a number of particular embodiments have been described, it will be understood that features and aspects that have been described with reference to each particular embodiment can be used with each remaining particularly described embodiment.

The invention claimed is:

1. A scanning apparatus for decoding an encoded symbol character of a symbology, comprising:
a laser source operable to emit a beam along an axis and illuminate a target, the target comprising the encoded symbol character;
a scanning mirror disposed intermediate the laser source and the target, the scanning mirror operable to deflect the beam emitted from the laser source so that the beam scans across the target according to a scan pattern;
a focusing apparatus in optical communication with the laser source for focusing the beam on the target at an object distance;
a detector operable to receive light of varying intensities scattered from the encoded symbol character and convert the light into a first signal;
a digitizer operable to convert the first signal to a digital bit stream; pre-stored information correlating a non-standard symbol pattern to a valid symbol character according to a standard definition of the symbology, the nonstandard symbol pattern comprising a first number of elements that deviates from a second number of elements associated with the valid symbol character; and
a decoder operable to receive the digital bit stream and utilize the pre-stored information for attempting decoding of the signal, wherein the scanning apparatus is further operable to one or more of (a) change a focus distance setting of the focusing apparatus responsively to a result of the attempting decoding and (b) generate the first signal with the focusing apparatus configured at a first focus distance setting, generate a second signal with the focusing apparatus configured at a second focus distance setting, and attempt decoding of the first signal and the second signal utilizing the pre-stored information.

2. The scanning apparatus according to claim 1 wherein the scanning apparatus is operable to generate the first signal with the focusing apparatus configured at a first focus distance setting, generate a second signal with the focusing apparatus configured at a second focus distance setting, and attempting decoding of the first signal and the second signal utilizing the pre-stored information.

3. The scanning apparatus according to claim 1 wherein the non-standard symbol pattern is a bar space pattern.

4. The scanning apparatus according to claim 3 wherein the symbology is selected from the group consisting of a Universal Product Code, a Code 39, and a PDF417 symbology.

5. The scanning apparatus according to claim 3 wherein the first number of elements is a 3-element width sequence and the second number of elements is a 4-element sequence, and the decoder utilizes the pre-stored information to decode the 3-element width sequence to the valid symbol character of the symbology.

6. The scanning apparatus according to claim 5 wherein the 3-element width sequence is generated by converting two 1-element widths to a single 2-element width.

7. The scanning apparatus of claim 1 wherein the focusing apparatus comprises a deformable lens element and an actuator, the deformable lens element having a deformable surface, at least part of which transmits the beam, the actuator operable to impart a force to the deformable surface.

8. The scanning apparatus of claim 7 wherein the force is in a first direction substantially parallel with the axis.

9. The scanning apparatus of claim 8 wherein the deformable surface is configured to deform along a second direction, opposite the first direction.

10. The scanning apparatus of claim 7 wherein the actuator imparts the force at a continuum of force impartation points formed in an area pattern about the axis.

11. The scanning apparatus of claim 7 wherein the focusing apparatus is an electro-wetting focusing apparatus comprising a pair of light transmissive liquids having different optical indices of refraction, one of the liquids having a drop shape accommodated in a well in a rest state for optically modifying the beam, the actuator being a voltage applied across one of the liquids to change the shape thereof.

12. The scanning apparatus of claim 1 wherein the scanning apparatus is operable to change a focus distance setting of a focusing apparatus responsively to a result of the attempting decoding.

13. A method for operating a scanning apparatus comprising the steps of:
providing a laser light source, a focusing apparatus, a detector, a digitizer, and a decoder;
providing pre-stored information correlating a non-standard symbol pattern to a valid symbol character according to a standard definition of a symbology, the non-standard symbol pattern comprising a first number of elements that deviates from a second number of elements associated with the valid symbol character;

activating the laser light source;

passing a laser beam through the focusing apparatus along an axis to illuminate a target, the target comprising an encoded symbol character;

scanning the encoded symbol character;

receiving scattered light from the target and converting it to a first signal;

converting the first signal to a second signal comprising a digital bit stream; and attempting decoding of the digital bit stream without utilizing the pre-stored information and;

attempting decoding of the digital bit stream utilizing the pre-stored information.

14. The method of claim 13 further comprising a step of comparing the signal to valid symbol patterns.

15. The method of claim 13 wherein the encoded symbol character on the target is a degraded encoded symbol character.

16. The method of claim 15 wherein the degraded encoded symbol character is selected from the group consisting of a Universal Product Code, a Code 39, and a PDF417 symbology.

17. The method of claim 16 wherein the non-standard symbol pattern is a 3-element width bar space pattern, the second number of elements associated with the valid symbol character is a 4-element bar space pattern, and the method further includes the step of obstructing two 1-element width sequences on the encoded symbol character to create one 2-element width sequence.

18. The method of claim 13 wherein the focusing apparatus is an electro-wetting focusing apparatus comprising a pair of light transmissive liquids having different optical indices of refraction, one of the liquids having a drop shape accommodated in a well in a rest state for optically modifying the beam.

* * * * *